(12) United States Patent
Ryu et al.

(10) Patent No.: US 8,146,384 B2
(45) Date of Patent: Apr. 3, 2012

(54) DUAL GAS AND HOT LIQUID ABSORPTION CHILLER ASSEMBLY

(75) Inventors: Jinsang Ryu, Gunpo-si (KR); Vivek Halwan, South Windsor, CT (US); Sunghan Jung, Glastonbury, CT (US); Jules Ricardo Munoz, South Windsor, CT (US); Jeffrey T. Benoit, Willington, CT (US); Veena Sharmila Sologar Thompson, Manchester, CT (US)

(73) Assignee: Carrier Corporation, Farmington, CT (US)

( * ) Notice: Subject to any disclaimer, the term of this patent is extended or adjusted under 35 U.S.C. 154(b) by 679 days.

(21) Appl. No.: 12/297,324

(22) PCT Filed: May 12, 2006

(86) PCT No.: PCT/US2006/018352
§ 371 (c)(1),
(2), (4) Date: Oct. 16, 2008

(87) PCT Pub. No.: WO2007/133201
PCT Pub. Date: Nov. 22, 2007

(65) Prior Publication Data
US 2010/0024447 A1    Feb. 4, 2010

(51) Int. Cl.
*F25B 15/00*    (2006.01)
(52) U.S. Cl. ............................................. 62/476; 62/101
(58) Field of Classification Search .................... 62/101, 62/238.3, 476
See application file for complete search history.

(56) References Cited

U.S. PATENT DOCUMENTS

| | | | |
|---|---|---|---|
| 4,439,999 A | 4/1984 | Mori et al. | |
| 4,589,262 A | 5/1986 | Nagao | |
| 6,122,930 A | 9/2000 | Nishiguchi et al. | |
| 6,233,968 B1 | 5/2001 | Nishiguchi et al. | |
| 6,393,863 B1 | 5/2002 | Nakajima et al. | |
| 6,523,357 B1 | 2/2003 | Katayama | |
| 6,598,420 B2 * | 7/2003 | Gupte | 62/497 |
| 6,666,042 B1 | 12/2003 | Cline et al. | |
| 6,877,338 B2 * | 4/2005 | Gupte | 62/497 |

OTHER PUBLICATIONS

International Search Report and Written Opinion of the International Searching Authority for International application No. PCT/US06/18352, mailed May 15, 2008.
International Preliminary Report on Patentability of the International Searching Authority for International application No. PCT/US06/18352, mailed Mar. 12, 2009.

* cited by examiner

*Primary Examiner* — Melvin Jones
(74) *Attorney, Agent, or Firm* — Carlson, Gaskey & Olds PC

(57) ABSTRACT

An absorption chiller assembly (20) includes a low-stage generator (42) that utilizes heat from vapor resulting from operation of a high-stage generator (26) and heat from another hot liquid such as coolant fluid associated with a prime mover (22). An example low-stage generator (42) includes an arrangement of conduits for directing flow of the two heat sources through the low-stage generator in a manner that both sources simultaneously interact with a refrigerant solution within the low-stage generator. A disclosed example includes an integrated diverter valve that is preassembled and packaged within an absorption chiller assembly. A disclosed heating mode in one example includes using an absorber (60) and a condenser (56) for heating fluid useful for heating operations.

28 Claims, 3 Drawing Sheets

DUAL GAS AND HOT LIQUID ABSORPTION CHILLER ASSEMBLY

FIELD OF THE INVENTION

This invention generally relates to absorption chillers.

DESCRIPTION OF THE RELATED ART

Absorption chillers are well known. Some are incorporated into a co-generation heating plant (CHP) system to provide cooling and in some cases heating and electrical power to a building, for example. Various modifications to the basic absorption chiller cycle have been implemented in attempts to maximize the efficiency and to increase the number of possible uses for an absorption chiller assembly.

Typical single-effect chillers include a generator, condenser, absorber, evaporator and a solution heat exchanger. Many arrangements use a lithium bromide water solution where the water component is considered a refrigerant and lithium bromide is considered an absorbent. Others use an ammonia water solution where ammonia is considered the refrigerant and water is considered the absorber.

Double effect chillers, which may be driven by high grade waste heat, direct-fired or co-fired, typically include a high-stage generator, a low-stage generator, a condenser, an absorber, an evaporator and two solution heat exchangers. In a double effect chiller arrangement, the primary heat source is provided to the high-stage generator and additional heat is recovered from the refrigerant generated in the high-stage generator using the low-stage generator. A variety of modifications to single and double effect chillers have been proposed.

One proposal is made in U.S. Pat. No. 4,589,262 where a high-stage generator is driven by engine exhaust, a low-stage generator is driven by jacket water associated with the engine and a second low-stage generator recovers heat from the refrigerant vapor from the high-stage generator. While that arrangement takes advantage of the engine exhaust and the jacket water as heat sources, the addition of a second low-stage generator adds material cost and potential maintenance issues over time.

Those skilled in the art are always striving to make improvements. It would be beneficial to provide a more efficient absorption chiller arrangement that maximizes the use of available heat sources without introducing additional components. This invention provides such an arrangement.

SUMMARY OF THE INVENTION

An exemplary absorption chiller assembly includes a high-stage generator configured to receive a flow of hot air. The high-stage generator heats a refrigerant and produces a resulting vapor. A low-stage generator is configured to receive a relatively high temperature liquid. The low-stage generator is also in fluid communication with the high-stage generator to receive the resulting vapor. The low-stage generator uses at least one of or both of the received hot liquid and the received vapor for heating a refrigerant.

In one example, the low-stage generator includes at least one hot liquid flow conduit for carrying the received hot liquid through the low-stage generator. The low-stage generator also includes at least one vapor flow conduit for carrying the received vapor. A refrigerant conduit carries the refrigerant such that the refrigerant is in a heat exchanging relationship with the hot liquid flow conduit and the vapor flow conduit. With such an arrangement, when a lithium bromide solution is used, the heat exchanging relationship between the lithium bromide solution and both of the flow conduits protects against undesirable crystallization of the lithium bromide.

An exemplary method of controlling an absorption chiller assembly having a high-stage generator and a low-stage generator includes providing a hot gas as a heat source to the high-stage generator. A vapor resulting from operation of the high-stage generator is provided to the low-stage generator as a heat source for the low-stage generator. A high temperature fluid is also supplied to the low-stage generator as another heat source.

One example method includes causing a lithium bromide solution within the low-stage generator to interact in a heat exchanging relationship with both sources of heat to the low-stage generator without separating them. Effectively mixing the sources of heat as they interact with the lithium bromide solution in the low-stage generator (rather than separating them) better protects against undesirable crystallization of the lithium bromide.

One example includes using an exemplary absorption chiller assembly in a heating mode. One example includes a direct coupling between a high-stage generator and an absorber for selectively communicating heated refrigerant solution from the high-stage generator to the absorber. Within the absorber, the heated refrigerant solution can be used for heating a fluid that is useful for heating a portion of a building, for example. In one example a conduit extends at least partially through the absorber and an associated condenser of the assembly so that the fluid in the conduit is heated by the heat in the absorber and the condenser.

One example includes a valve for selectively controlling whether resulting refrigerant vapor from the high-stage generator is communicated to the low-stage generator or directly to an absorber. During a heating mode, the refrigerant vapor can selectively be provided directly to the absorber as another source of heat for the fluid passing at least partially through the absorber and at least partially through the condenser.

In one example, heat within the condenser resulting from the low-stage generator processing the heated coolant fluid from the energy source provides another source of heat for heating the fluid used in the heating mode.

The various features and advantages of this invention will become apparent to those skilled in the art from the following detailed description. The drawings that accompany the detailed description can be briefly described as follows.

DETAILED DESCRIPTION

Figure 1:
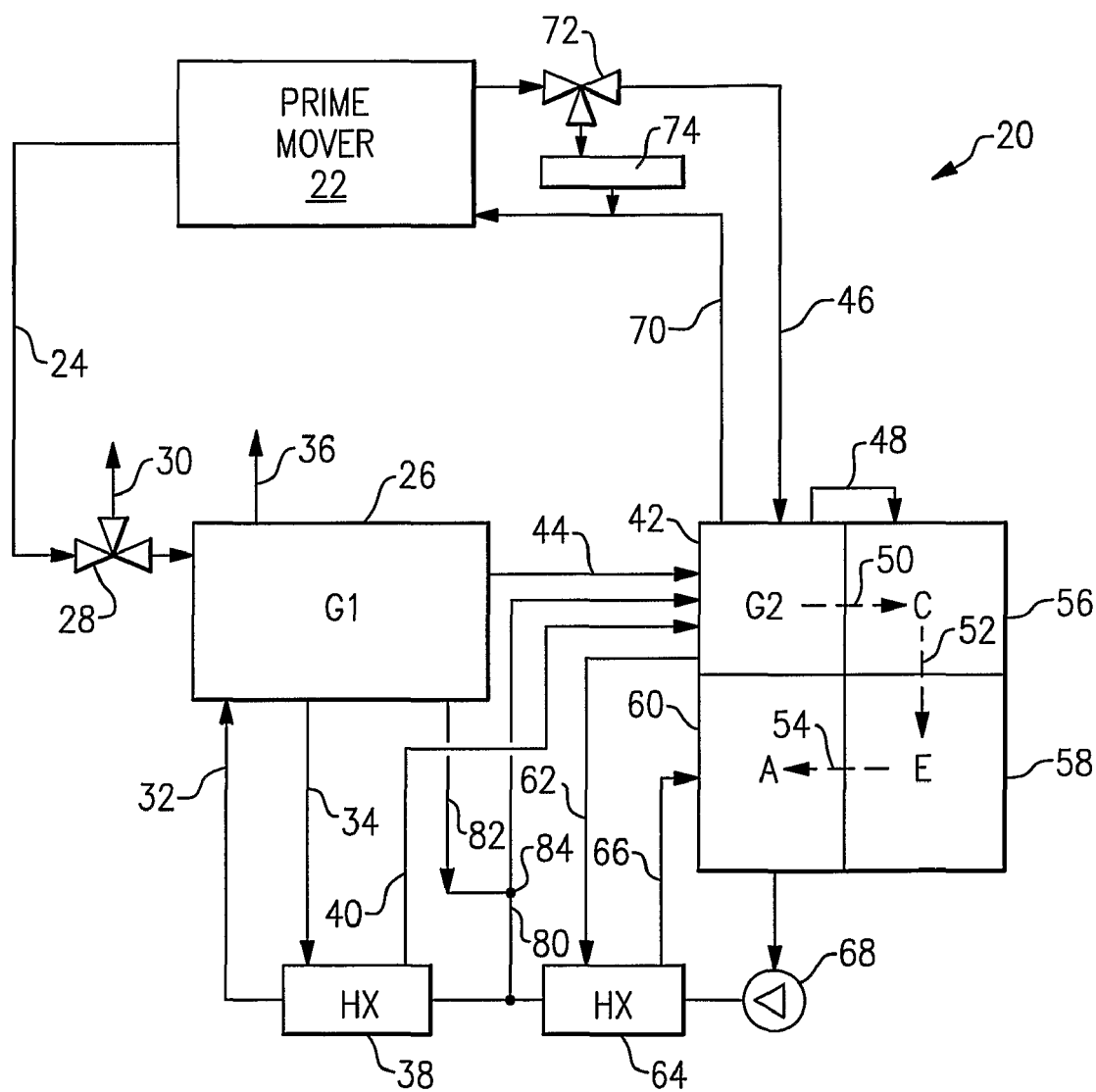
FIG. 1 schematically illustrates selected portions of an absorption chiller assembly desired according to an embodiment of this invention.

FIG. 1 schematically illustrates selected portions of an absorption chiller assembly 20. A prime mover 22 such as an engine operates as an energy source. Exhaust flow from the prime mover 22 is directed through at least one conduit 24 to a high-stage generator 26, which uses the exhaust as a source of heat. Other hot gases are used by the high-stage generator in some examples. For purposes of discussion, the exhaust from the prime mover 22 is the hot gas in the illustrated example.

The illustrated example includes a diverter valve 28 that is used for selectively controlling whether exhaust is provided to the high-stage generator 26 or vented to atmosphere as schematically shown at 30. The diverter valve 28 in this example has multiple modes of operation. It can direct all of the flow to atmosphere, the high-stage generator 26, or in a continuously variable fashion to both, simultaneously. The continuously variable method may offer advantages such as smoother transitions between cooling demand loads. The high-stage generator 26 includes a vent 36 to atmosphere, which operates in a known manner.

A refrigerant/absorbent solution is provided to the high-stage generator 26 at an inlet 32. In one example, the solution comprises lithium bromide and water where the lithium bromide acts as an absorbent and the water acts as a refrigerant. Another example arrangement includes an ammonia water solution where the water acts as an absorbent and the ammonia acts as a refrigerant. The solution becomes heated in the high-stage generator 26 to the point where the water at least partially separates from the lithium bromide as steam.

The more concentrated, heated lithium bromide solution flows through an outlet 34 to a heat exchanger 38. The lithium bromide solution within the heat exchanger 38 then flows through an inlet 40 into a low-stage generator 42. The example low-stage generator uses two heat sources for heating the solution received at the inlet 40. The vapor refrigerant from the high-stage generator 26 flows through an inlet 44 to the low-stage generator 42. Another heat source for the low-stage generator 42 is a hot liquid. In the illustrated example, the hot liquid comprises fluid flowing from the prime mover 22 such as jacket water or another coolant fluid.

Such an arrangement of a low-stage generator is unique in that it uses two heat sources instead of one. The example low-stage generator 42 enhances the coefficient of performance of an absorption chiller assembly compared to previous arrangements, in part, because it takes advantage of more of the available waste heat to operate the chiller assembly 20.

As the solution is heated within the low-stage generator 42, additional refrigerant vapor flows through a conduit 48 and the liquid refrigerant flows as schematically shown at 50, 52 and 54 from the low-stage generator 42 to a condenser 56 then to an evaporator 58 and then to an absorber 60. Some of the solution from the low-stage generator 42 flows through an outlet 62 to a heat exchanger 64. That solutions flows through an inlet 66 to the absorber 60.

A pump 68 draws out the solution from the absorber 60 where the lithium bromide, for example, has absorbed water and the cycle continues by providing the solution through the inlet 32 to the high-stage generator 26.

The example arrangement of FIG. 1 includes a fluid return conduit 70 between the low-stage generator 42 and the appropriate portion of the prime mover 22 (e.g., a radiator or cooling jacket). The illustrated example also includes a three-way diverter valve 72 for selectively controlling flow of the coolant fluid from the prime mover 22 to the low-stage generator 42. The illustrated example includes a water heater 74 that can be operated in parallel with the low-stage generator 42 using some of the heated coolant from the prime mover 22 or, in some circumstances, may be used while bypassing the low-stage generator 42. Hot water from the hot water heater 74 may be used for building heating purposes or hot water supply, for example.

Controlling the valve 72 may strategically be coordinated with the control of the valve 28 to achieve desired performance and to maximize use of the available heat sources. Using the valve 28 in one example includes minimizing on/off cycling to extend the life of the valve. At the same time, maximum usage of the exhaust waste heat is possible by prioritizing exhaust heat over coolant water heat, which is accomplished by controlling the valves 28 and 72. Minimizing valve cycling is a goal in one example. An additional advantage to such an approach is increasing the part load efficiency of the absorption chiller. In one example, the part load coefficient of performance is greater than 1.

Another feature of the example of FIG. 1 is a lithium bromide solution split between the heat exchangers 38 and 64. The illustrated example includes at least one conduit 80 that allows some of the fluid exiting the heat exchanger 64 to flow to the low-stage generator 42. In this example, the high-stage generator 26 includes a conduit 82 that is coupled to an eductor 84 associated with the conduit 80.

If the lithium bromide solution level in the high-stage generator 26 rises above a selected threshold, suction power created in the liquid eductor 84 will remove excess solution from the high-stage generator 26 through the conduit 82. The conduit 80 allows such solution to flow to the low-stage generator 42. One advantage to such an arrangement is that it provides a separate solution supply for the low-stage generator 42. This ensures that the low-stage generator 42 always receives a flow of lithium bromide solution regardless of what is happening in the high-stage generator 26.

Figure 2:
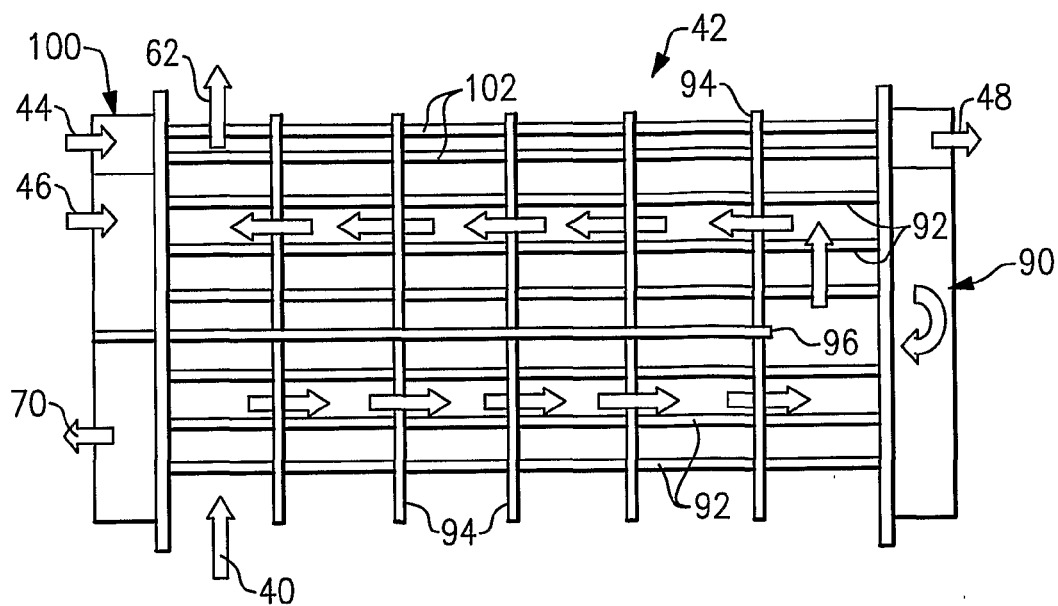
FIG. 2 schematically illustrates selected portions of a low-stage generator that is useful in the embodiment of FIG. 1.

Referring to FIG. 2, one example embodiment of a low-stage generator 42 includes at least one coolant flow conduit 90 for receiving the coolant fluid from the prime mover 22 through the inlet 46. In this example, the coolant flow conduit comprises a plurality of tubes 92 through which the coolant flows between the inlet 46 and the outlet 70.

A plurality of baffles 94 are arranged along with a partition plate 96 in a known manner for directing the solution flow from the inlet 40 to the outlet 62. The baffles 94 in one example are arranged to cause the solution to flow over one baffle and then beneath the next in a generally serpentine flow pattern. The partition plate 96 facilitates flow as schematically shown by the arrows in FIG. 2.

The example of FIG. 2 also includes at least one refrigerant flow conduit 100 for receiving the refrigerant (e.g., steam) through the inlet 44 from the high-stage generator 26. In this example, the refrigerant flow conduit comprises a plurality of tubes 102.

One unique aspect of the example arrangement shown in FIG. 2 is that the solution flowing from the inlet 40 to the outlet 62 is in a heat exchanging relationship with the coolant flow conduit 90 and the refrigerant flow conduit 100. The solution (e.g., a lithium bromide solution) in this example interacts with both heat sources of the low-stage generator 42. In other words, the solution flows through a shell side of the low-stage generator 42 such that at least some of the solution is in a heat exchange relationship with the coolant flow conduit 90 and the refrigerant flow conduit 100, simultaneously.

Such an arrangement has the advantage of minimizing the possibility that lithium bromide will become crystallized within the low-stage generator 42. Crystallization of lithium bromide is at least partially temperature dependent. When a temperature associated with one of the heat sources to the low-stage generator 42 results in conditions that are likely to result in crystallization, the temperature associated with the other heat source will counteract that possibility and minimize a chance of crystallization. Preventing crystallization is important for uninterrupted and desirable operation of an absorption chiller assembly. The disclosed example technique of processing the solution through the low-stage generator, therefore, has advantages compared to previous arrangements that only used one heat source for a low-stage generator.

Figure 3:
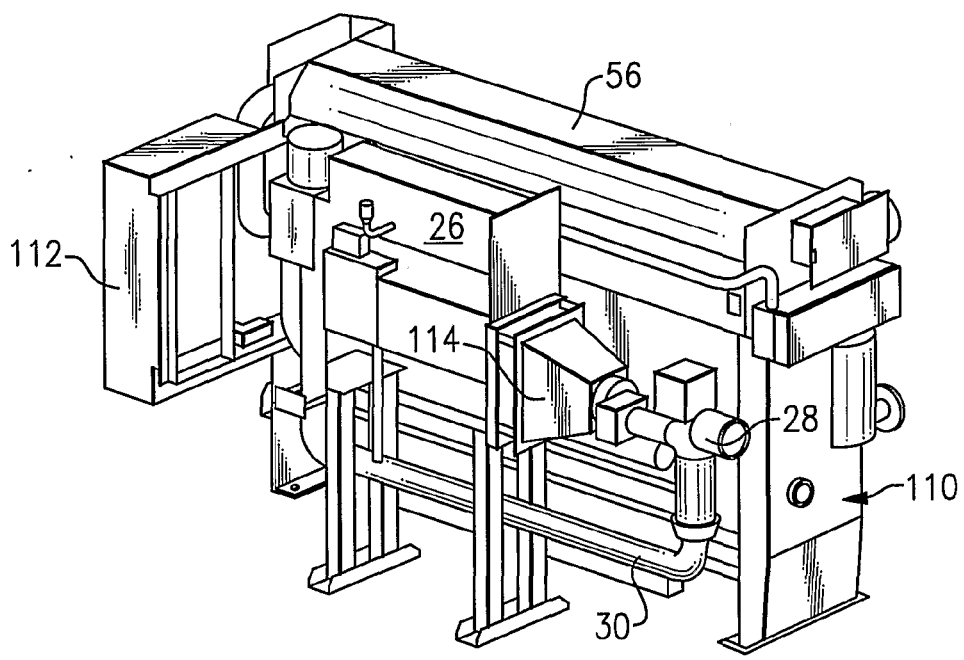
FIG. 3 diagrammatically illustrates an example embodiment of an absorption chiller assembly designed according to one embodiment of this invention.

FIG. 3 shows one example arrangement that incorporates the diverter valve 28 as part of a preassembled absorption chiller assembly. This example arrangement differs from previous arrangements that required installation and connection of a diverter valve on-site separate from the absorption chiller assembly. By integrating the diverter valve into the preassembled assembly, the example of FIG. 3 provides several advantages.

One advantage is that space requirements are reduced because a diverter valve is within the "envelope" of a main body 110 and a control panel 112 of the example assembly. The main body 110 supports or includes such components as the generators 26 and 42, the condenser 56, the evaporator 58, the absorber 60 and the heat exchangers 38 and 64. Another advantage is that the valve 28 is appropriately connected to the inlet to the high-stage generator 26 and appropriately wired to the control panel 112, which reduces the chance for error during installation.

In the illustrated example, the high-stage generator 26 is strategically positioned relative to the control panel 112 and a transition duct 114 is sized to accommodate the diverter valve 28 within the packaging envelope of the example assembly. In this example, the transition duct 114 is shorter than previous designs, which combined with the placement of the high-stage generator 26 accommodates the diverter valve 28 within the packaging envelope of the assembly.

Another aspect of an example like the one shown in FIG. 3 is that the high-stage generator 26 is designed to prevent or eliminate low temperature zones where condensation might occur and cause corrosion. Heat exchanger size and configuration are balanced to avoid corrosion. Such a design is useful, for example, with stoichiometric reciprocating engines that produce relatively moist exhaust (e.g., more than 10% water), which can condense at temperatures below about 60° C.

Figure 4:
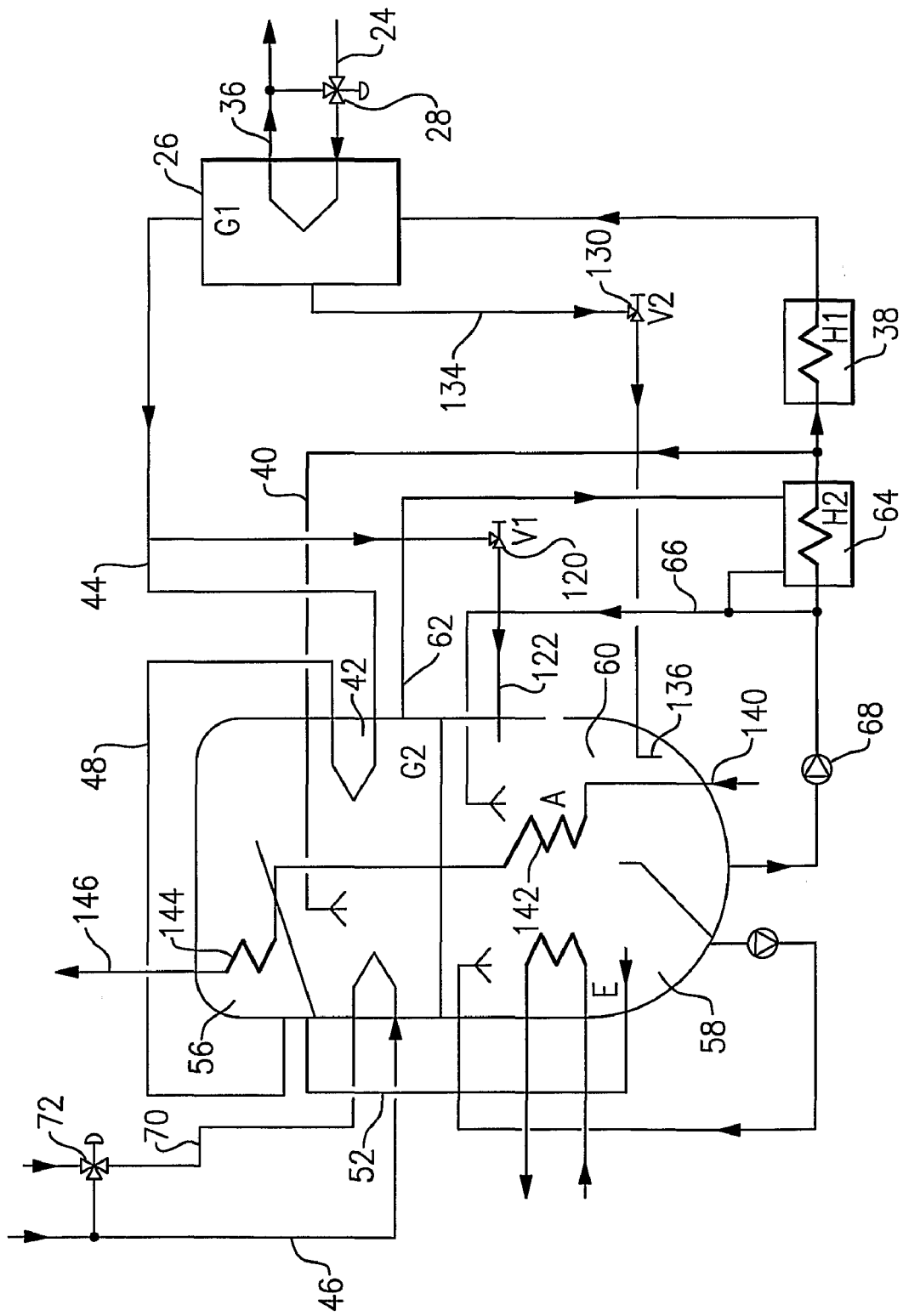
FIG. 4 schematically illustrates one example way of operating the embodiment of FIG. 1 in a heating mode.

FIG. 4 schematically illustrates an example arrangement for using an absorption chiller assembly that has two heat sources for a low-stage generator 42 in a heating mode. In this example, the refrigerant vapor exiting the high-stage generator 26 normally flows through the inlet 44 to the low-stage generator 42 during cooling mode. During heating mode, a controller valve 120 opens to create a lower resistance flow path from the high-stage generator to an inlet 122 to the absorber 60. At least some of the refrigerant steam from the high-stage generator 26 during the example heating mode flows directly into the absorber 60.

The absorber 60 also receives at least some of the heated solution (e.g., lithium bromide) directly from the high-stage generator 26 when a control valve 130 opens to bypass the flow that otherwise would occur through the outlet 34 shown in the example of FIG. 1 to carry the solution to the heat exchanger 38. In the example of FIG. 4, when the valve 130 opens, a conduit 134 carries the heated solution from the high-stage generator 26 to an inlet 136 in the absorber 60. The inlets 122 and 136 in the absorber receive heated fluid which is used to heat another fluid such as water flowing through an inlet 140 into a conduit associated with or at least partially within the absorber 60. A heat exchange section 142 allows the fluid flowing through the inlet 140 to absorb heat within the absorber. That fluid then continues on to the condenser 56 where it is further heated in a heat exchanger section 144 associated with or at least partially within the condenser 56.

In the example of FIG. 4, heat within the low-stage generator 42 as a result of receiving the prime mover coolant fluid remains at least partially within the low-stage generator 42 and the condenser 56. This can be controlled by controlling steam flow resulting from heating refrigerant solution in the low-stage generator 42, for example. The heat from such steam heats the fluid within the heat exchanger section 144 before that fluid exits through an outlet 146.

The illustrated arrangement is unique in that the absorber 60 and the condenser 56 are used for heating a fluid such as water during a heating mode. Other arrangements have used evaporators associated with absorption chillers for heating water but, prior to this invention, no one has used a condenser alone or combined with an absorber as shown in this example to achieve heated fluid during a heating mode.

There are various advantages provided by the disclosed examples. One advantage is a higher efficiency and higher coefficient of performance compared to systems that use single or double effect chillers. The direct use of high grade waste heat (e.g., the prime mover exhaust) and low grade waste heat (e.g., the coolant fluid of the prime mover 22) makes better use of the majority of the available waste heat. In one example, the low-stage generator 42 increases the coefficient of performance of the heat recovery from the high-stage generator 26 to a value of approximately 1.25. Without the disclosed example, the coefficient of performance was typically on the order of 0.7.

One advantage associated with an embodiment as illustrated in FIG. 2 is that the cooperation of the two heat sources interacting with the refrigerant solution reduces or minimizes the possibility for crystallization of lithium bromide, for example.

Another advantage is reducing the size and installation costs associated with incorporating a diverter valve into the supply to the high-stage generator. The example embodiment of FIG. 3 integrates the diverter valve in a manner that provides cost, space and labor savings.

Another advantage associated with the example of FIG. 4 is an additional heating function that takes advantage of the waste heat from the coolant fluid of the prime mover 22 within the low-stage generator 42 and uses heat from the high-stage generator 26 and the absorber 60 to provide a heating function.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. An absorption chiller assembly, comprising
   a high-stage generator configured to receive hot gas, the high-stage generator heating a refrigerant solution by using the received hot gas and producing a resulting refrigerant vapor from the refrigerant solution; and
   a low-stage generator containing refrigerant solution, the low stage generator being configured to receive hot liquid and in fluid communication with the high-stage generator to receive the resulting refrigerant vapor, the low-stage generator using both of the received hot liquid and the received refrigerant vapor for heating refrigerant solution in the low stage generator.

2. The assembly of claim 1, wherein the hot gas comprises exhaust from an energy source and the hot liquid comprises heated coolant from the energy source.

3. The assembly of claim 1, wherein the low-stage generator comprises
   at least one hot liquid flow conduit for carrying the received hot liquid through the low-stage generator;

at least one vapor flow conduit for carrying the received vapor; and a refrigerant solution conduit for carrying the refrigerant solution such that the refrigerant solution is in a heat exchanging relationship with the at least one hot liquid flow conduit and the at least one vapor flow conduit.

4. The assembly of claim 3, wherein the at least one hot liquid flow conduit comprises a first plurality of tubes and the at least one vapor flow conduit comprises a second, separate plurality of tubes.

5. The assembly of claim 4, including a single flow path for the refrigerant solution in the heat exchanging relationship with the hot liquid flow conduit tubes and the vapor flow conduit tubes.

6. The assembly of claim 5, wherein at least some of the refrigerant solution in the single flow path is simultaneously in the heat exchanging relationship with the hot liquid flow conduit tubes and the vapor flow conduit tubes.

7. The assembly of claim 3, wherein the at least one hot liquid flow conduit is immediately adjacent the at least one vapor flow conduit.

8. The assembly of claim 1, comprising
a control panel;
a condenser associated with the low-stage generator;
an evaporator associated with the condenser;
an absorber associated with the evaporator;
at least one heat exchanger associated with at least one of the generators; and
a diverter valve incorporated into the assembly within a packaging envelope defined by the control panel, condenser, evaporator, absorber and the at least one heat exchanger.

9. The assembly of claim 8, comprising a preassembled assembly having an established fluid communication coupling between the high-stage generator and the diverter valve and an established electrically conductive coupling between the control panel and the diverter valve.

10. The assembly of claim 1, comprising
an absorber; and
at least one coupling between the high-stage generator and the absorber for directly communicating at least some of at least one of the resulting refrigerant vapor or heated refrigerant solution from the high-stage generator to the absorber.

11. The assembly of claim 10, comprising a valve associated with the at least one coupling for selectively controlling direct communication of the at least one of the resulting refrigerant vapor or the heated refrigerant solution to the absorber.

12. The assembly of claim 11, wherein the at least one coupling comprises
a first coupling for directly communicating the resulting refrigerant vapor to the absorber; and
a second coupling for directly communicating the heated refrigerant solution to the absorber.

13. The assembly of claim 12, comprising
a first valve associated with the first coupling for controlling flow through the first coupling; and
a second valve associated with the second coupling for controlling flow through the second coupling.

14. The assembly of claim 10, comprising
a condenser; and
at least one conduit for carrying a fluid at least partially through the absorber and at least partially through the condenser where the fluid is heated by heat in the absorber and the condenser, respectively.

15. The assembly of claim 1, comprising
a condenser associated with the low-stage generator, the condenser having heat within the condenser resulting from at least the hot liquid provided to the low-stage generator;
an absorber that selectively receives at least some of at least one of the resulting refrigerant vapor or heated refrigerant solution directly from the high-stage generator; and
wherein the absorber and the condenser cooperate to heat at least one other fluid.

16. The assembly of claim 15, comprising
at least one conduit for carrying the at least one other fluid at least partially in a heat exchange relationship with the absorber and the condenser.

17. The assembly of claim 15, wherein heat within the absorber resulting from at least the directly received one of the resulting refrigerant vapor or the heated refrigerant and heat within the condenser resulting at least from the coolant provided to the low-stage generator cooperate to heat the at least one other fluid.

18. The assembly of claim 1, comprising:
a first heat exchanger that receives fluid from the high-stage generator;
a second heat exchanger that receives fluid from the low-stage generator fluid exiting the second heat exchanger flowing to the first heat exchanger; and
a conduit carrying at least some of the fluid exiting the second heat exchanger to the low-stage generator, the conduit having an eductor that selectively receives fluid from the high-stage generator.

19. The assembly of claim 18, comprising
a conduit between the high-stage generator and the eductor.

20. A method of operating an absorption chiller assembly having a high-stage generator and a low-stage generator, comprising
heating refrigerant solution within the high-stage generator using a first source of heat;
heating refrigerant solution within the low-stage generator using a second source of heat producing a resulting vapor from the heated refrigerant solution; and
heating the refrigerant solution within the low-stage generator using the resulting vapor from the high-stage generator.

21. The method of claim 20, comprising heating the same refrigerant using heat from the resulting vapor and the second source of heat simultaneously within the low-stage generator.

22. The method of claim 20, wherein the first source of heat comprises exhaust from an energy source and the second source of heat comprises a coolant from the energy source.

23. The method of claim 20, wherein the assembly has an absorber and a condenser and the method comprises selectively using the absorber and the condenser for heating at least one other fluid to provide a heating function.

24. The method of claim 23, comprising selectively providing at least some of at least one of the heated refrigerant solution or the resulting refrigerant vapor directly to the absorber for heating the at least one other fluid.

25. A method of operating an absorption chiller assembly having a high-stage generator and a low-stage generator, comprising
heating refrigerant solution within the high-stage generator using a first source of heat;
heating refrigerant solution within the low-stage generator using a second source of heat; and
heating the refrigerant solution within the low-stage generator using a resulting vapor from the high-stage generator, wherein the absorption chiller assembly includes a diverter valve and the method comprises:

selectively controlling the diverter valve to variably direct some of the first source of heat to the high-stage generator and a remainder of the first source of heat to atmosphere.

26. A method of operating an absorption chiller assembly having a high-stage generator and a low-stage generator, comprising heating refrigerant solution within the high-stage generator using a first source of heat;

heating refrigerant solution within the low-stage generator using a second source of heat; and heating the refrigerant solution within the low-stage generator using a resulting vapor from the high-stage generator, including prioritizing use of the first source of heat over the use of the second source of heat.

27. The method of claim 20, comprising configuring the high-stage generator to minimize any low temperature zones in the high-stage generator.

28. The assembly of claim 1, wherein all of the refrigerant in the low stage generator is heated by heat from the received hot liquid and the received refrigerant vapor.

* * * * *